US012020191B2

United States Patent
Dutta et al.

(10) Patent No.: US 12,020,191 B2
(45) Date of Patent: Jun. 25, 2024

(54) METHODS AND APPARATUS FOR AUTOMATIC SALE FORECASTS USING MACHINE LEARNING PROCESSES

(71) Applicant: Walmart Apollo, LLC, Bentonville, AR (US)

(72) Inventors: Tulika Dutta, West Bengal (IN); Sri Naga Venkata Sai Yaswanth Meduri, Rogers, AR (US); Ishant Virendra Wankhede, Maharashtra (IN)

(73) Assignee: Walmart Apollo, LLC, Bentonville, AR (US)

( * ) Notice: Subject to any disclaimer, the term of this patent is extended or adjusted under 35 U.S.C. 154(b) by 213 days.

(21) Appl. No.: 17/587,694

(22) Filed: Jan. 28, 2022

(65) Prior Publication Data

US 2023/0281531 A1   Sep. 7, 2023

(51) Int. Cl.
*G06Q 10/00* (2023.01)
*G06N 20/20* (2019.01)
(Continued)

(52) U.S. Cl.
CPC ....... *G06Q 10/06315* (2013.01); *G06N 20/20* (2019.01); *G06Q 10/06375* (2013.01); *G06Q 30/0206* (2013.01)

(58) Field of Classification Search
CPC .......................................... G06Q 10/00–50/00
(Continued)

(56) References Cited

U.S. PATENT DOCUMENTS 11,636,381 B1 * 4/2023 Joseph ............... G06Q 30/0202
706/12
2016/0283953 A1 * 9/2016 Ettl ..................... G06Q 30/0206
(Continued)

FOREIGN PATENT DOCUMENTS

| CN | 111652657 A | 9/2020 |
|---|---|---|
| KR | 101950996 B1 | 2/2019 |

OTHER PUBLICATIONS

Sarah Beckham, "Why Omnichannel Will Beat Out Multi-Channel Retail," Jun. 4, 2021, Top Trend in 2021: Omnichannel Will Beat Out Multi-Channel, 10 pages.
(Continued)

*Primary Examiner* — Mustafa Iqbal
(74) *Attorney, Agent, or Firm* — Morgan, Lewis & Bockius LLP; Manita Rawat

(57) ABSTRACT

This application relates to employing trained machine learning processes to predict sales across various sale channels. For example, a computing device may generate features based on historical sales information, and trains the machine learning processes based on the generated features. In some examples, the computing device determines fixed cost effects from selling items across various sales channels, and adjusts the sales information based on the fixed cost effects. The computing device also generates features based on the adjusted sales. The computing device may apply the trained machine learning processes to sales information for one or more items to predict the sales of one or more items across one or more sales channels during a future temporal period. In some examples, the trained machine learning processes generate a ranking of items for a sales channel based on the output generated from the trained machine learning processes.

13 Claims, 9 Drawing Sheets

(51) Int. Cl.
*G06Q 10/0631* (2023.01)
*G06Q 10/0637* (2023.01)
*G06Q 30/00* (2023.01)
*G06Q 30/0201* (2023.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 2021/0192618 A1* | 6/2021 | Asady | .................... | G06Q 40/04 |
| 2023/0081051 A1* | 3/2023 | Brooks | ................ | G06Q 10/087 |
| | | | | 705/28 |
| 2023/0196278 A1* | 6/2023 | Harsha | ............. | G06Q 10/06393 |
| | | | | 705/7.31 |
| 2023/0351172 A1* | 11/2023 | Bar Eliyahu | ......... | G06F 40/216 |

OTHER PUBLICATIONS

Kui Zhao, et al., "Sales Forecast in E-commerce using Convolutional Neural Network," Aug. 26, 2017, 9 pages.

\* cited by examiner

METHODS AND APPARATUS FOR AUTOMATIC SALE FORECASTS USING MACHINE LEARNING PROCESSES

TECHNICAL FIELD

The disclosure relates generally to machine learning processes and, more specifically, to automatically forecasting sales using machine learning processes.

BACKGROUND

Retailers can benefit from maximizing sales. For example, retailers may increase profits as sales increase. Often times, however, retailers fail to properly price items, thus causing a decrease to their sales. Retailers may also fail to place items for sale in a channel that would otherwise increase sales of those items. For example, a retailer may decide to sell an item online, but not in a store, although the retailer may increase sales if the item were sold in stores. As another example, a retailer may decide to allow a third party to sell an item on the retailer's website (e.g., for a fee), rather than selling the item themselves, although the retailer would realize higher profits if the retailer sold the item themselves. In some instances, a retailer may fail to stock a level of inventory that would increase or maximize profits. For example, the retailer may not stock enough of the item in stores, or may set aside too much inventory of the item for online sales. Thus, there are opportunities to address the forecasting of sales across a variety of sale channels.

SUMMARY

The embodiments described herein are directed to using trained machine learning processes to predict sales across various sale channels. The embodiments may include generating features from historical sales information, and training the machine learning processes based on generated features. In some examples, generating the features includes determining fixed cost effects from selling items across various channels, adjusting sales for the items based on the fixed cost effects, and generating features based on the adjusted sales. In some embodiments, the trained machine learning processes are applied to historical sales information to predict the sales of one or more items across one or more channels during a future temporal period. In some examples, the trained machine learning processes generate a ranking of items for each of a plurality of channels. The ranking of items may characterize a recommendation of one or more channels that an item be sold through.

Among other advantages, the embodiments may allow a retailer to more reliably predict sales of items across the various channels at, for example, various price points, allowing the retailer to determine through which channel an item should be sold through. The embodiments may further allow a retailer to increase sales of an item, such as by allocating inventory to a channel through which more of the item would be sold, or through which the retailer would increase or maximize profits on that item. Persons of ordinary skill in the art having the benefit of these disclosures would recognize these and other benefits as well.

In accordance with various embodiments, exemplary systems may be implemented in any suitable hardware or hardware and software, such as in one or more suitable computing devices. For example, in some embodiments, a computing device (e.g., server) comprising at least one processor obtains first sales data for a first channel (e.g., sales channel) for a plurality of items for a first temporal period (e.g., a month, a quarter, a year, etc.). The computing device also obtains second sales data for a second channel for the plurality of items for a second temporal period. In some examples, the second temporal period is subsequent to the first temporal period. Further, the computing device determines at least one fixed effect value for at least one of the plurality of items based on the first sales data and the second sales data. The at least one fixed effect value may characterize, for example, a category effect (e.g., a sales effect of an item's category on its price in varying channels), a department effect (e.g., a sales effect of an item's department on its price in varying channels), or a general effect (e.g. a sales effect of selling an item in varying channels). The computing device also determines a treatment effect value for each of the plurality of items based on the corresponding fixed effect value, where the treatment effect value characterizes a sales effect of selling each of the plurality of items in the second channel compared to the first channel. Further, the computing device adjusts the second sales data for the plurality of items based on the corresponding treatment effect value. The computing device also generates a plurality of features based on the adjusted second sales data for the plurality of items. In some examples, the computing device generates output data characterizing a mapping of the plurality of features to predicted sales changes from the first channel to the second channel.

In some embodiments, a method by at least one processor includes obtaining first sales data for a first channel for a plurality of items for a first temporal period. The method also includes obtaining second sales data for a second channel for the plurality of items for a second temporal period. In some examples, the second temporal period is subsequent to the first temporal period. Further, the method includes determining at least one fixed effect value for at least one of the plurality of items based on the first sales data and the second sales data. The method also includes determining a treatment effect value for each of the plurality of items based on the corresponding fixed effect value, where the treatment effect value characterizes a sales effect of selling each of the plurality of items in the second channel compared to the first channel. Further, the method includes adjusting the second sales data for the plurality of items based on the corresponding treatment effect value. The method also includes generating a plurality of features based on the adjusted second sales data for the plurality of items. In some examples the method further includes generating output data characterizing a mapping of the plurality of features to predicted sales changes from the first channel to the second channel.

In some embodiments, a non-transitory computer readable medium has instructions stored thereon. The instructions, when executed by at least one processor, cause a device to perform operations that include obtaining first sales data for a first channel for a plurality of items for a first temporal period. The operations also include obtaining second sales data for a second channel for the plurality of items for a second temporal period. In some examples, the second temporal period is subsequent to the first temporal period. Further, the operations include determining at least one fixed effect value for at least one of the plurality of items based on the first sales data and the second sales data. The operations also include determining a treatment effect value for each of the plurality of items based on the corresponding fixed effect value, where the treatment effect value characterizes a sales effect of selling each of the plurality of items in the second channel compared to the first channel. Further, the operations include adjusting the second sales data for the plurality of items based on the corresponding treatment effect value. The operations also include generating a plurality of features based on the adjusted second sales data for the plurality of items. In some examples the operations further include generating output data characterizing a mapping of the plurality of features to predicted sales changes from the first channel to the second channel.

In some embodiments, a computing device (e.g., server) comprising at least one processor obtains sales data for at least one item. The computing device also generates a plurality of features based on the sales data, first channel data characterizing a first channel, and second channel data characterizing a second channel. Further, the computing device applies a trained machine learning process to the generated features to generate output data characterizing predicted sales changes from the first channel to the second channel. The computing device also stores the output data in a database.

In some embodiments, a method by at least one processor includes obtaining sales data for at least one item. The method also includes generating a plurality of features based on the sales data, first channel data characterizing a first channel, and second channel data characterizing a second channel. Further, the method includes applying a trained machine learning process to the generated features to generate output data characterizing predicted sales changes from the first channel to the second channel. The method also includes storing the output data in a database.

In some embodiments, a non-transitory computer readable medium has instructions stored thereon. The instructions, when executed by at least one processor, cause a device to perform operations that include obtaining sales data for at least one item. The operations also include generating a plurality of features based on the sales data, first channel data characterizing a first channel, and second channel data characterizing a second channel. Further, the operations include applying a trained machine learning process to the generated features to generate output data characterizing predicted sales changes from the first channel to the second channel. The operations also include storing the output data in a database.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
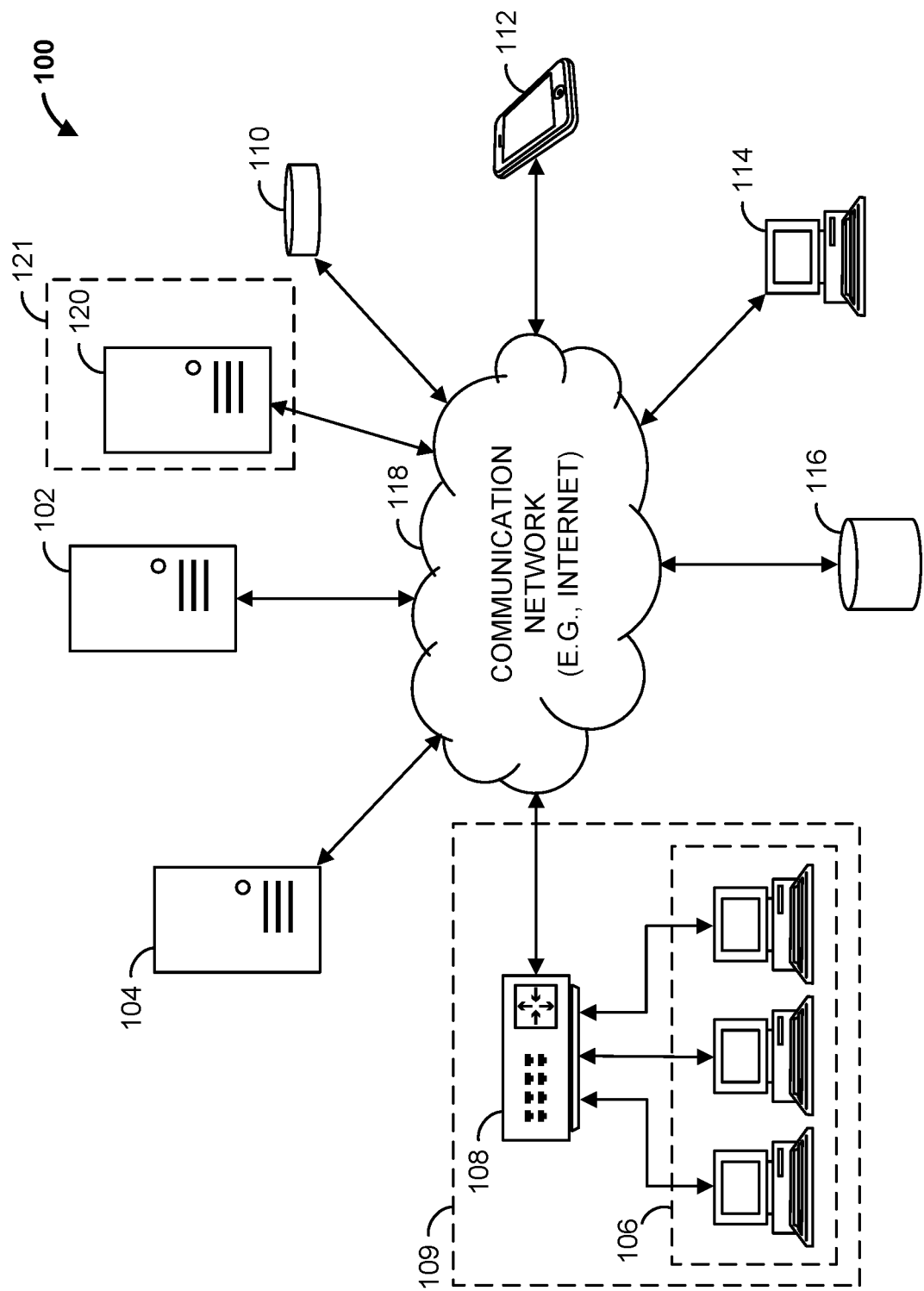
FIG. 1 is a block diagram of a forecasting system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments employ machine learning processes to generate sales forecasts across various sale channels. For example, the machine learning processes may generate output data characterizing an increase, or a decrease, in sales of an item during a future temporal period (e.g., the next 30 days, next quarter, the next month, etc.) if the item were sold on a different sales channel than an initial (e.g., current) sales channel. A sales channel may be characterized by how or where items are sold (e.g., online, in-store, etc.), and/or whether a retailer selling the item controls the item price and/or item inventory. For example, a first sales channel may include in-store or online sales of an item in which a retailer maintains item inventory and controls the item selling price. A second sales channel may include in-store or online sales of an item in which a third-party (e.g., manufacturer) sets the item price, but the retailer maintains the item inventory (e.g., in the retailer's warehouse). A third sales channel may include in-store or online sales of an item in which the third-party controls the price and maintains the inventory (e.g., direct shipment of orders). Accordingly, sales channels may be defined by the retailer in any suitable manner.

The machine learning processes may be trained based on sales data (e.g., in-store and/or online sales data, transactional data) for a plurality of items sold across differing sales channels. For example, for a given item, first features may be generated based on historical sales data for the item during a first temporal period where the item was sold through a first sales channel. Similarly, for the given item, second features may be generated based on historical sales data for the item during a second temporal period where the item was sold through a second sales channel. Further, and as discussed herein, to generate the second features, the embodiments determine fixed sales effects due to selling the item though the second sales channel instead of through the first sales channel. Fixed sales effects may include, for example, a category effect (e.g., a sales effect of an item's category on its price in the second sales channel compared to the first sales channel), a department effect (e.g., a sales effect of an item's department on its price in the second sales channel compared to the first sales channel), or a general effect (e.g. a sales effect of selling an item in the second sales channel compared to the first sales channel). Based on the determined fixed sales effects as well as the sales for the item in the first sales channel (e.g., total sales in the first sales channel during the first temporal period) and the second sales channel (e.g., total sales in the second sales channel during the second temporal period), the embodiments may determine a treatment effect, where the treatment effect characterizes a change is sales (e.g., "sales effect") of selling the item through the second sales channel compared to the first sales channel. For example, the treatment effect may be a value greater than, or less than, a total sales of the item during the second temporal period when sold through the second sales channel. The second features may then be generated based on the determined treatment effect for the item.

The first features and/or the second features may characterize, for example, a delivery speed for an item (e.g., how fast the item gets to the purchasing customer when an order is placed when sold in a corresponding sales channel), a price (e.g., the price of the item when sold in a corresponding sales channel), delivery speed ratios (e.g., ratio of delivery speeds corresponding to each sales channel), and/or price ratios (e.g., ration of the prices of the item corresponding to each sales channel). Further, third features may be generated based on third-party data, which may characterize sales of the item by other retailers or suppliers.

The embodiments may include training the machine learning processes based on the generated features (e.g., the first features, the second features, and/or the third features) to generate output data characterizing, for example, an expected sales amount (e.g., sales change) if an item is sold through a particular sales channel during a future temporal period (e.g., in the next month, the next quarter, during a holiday season, etc.). The machine learning processes may include, for example, machine learning or artificial intelligence models (e.g., a Random Forrest Regression model, a Gradient based Decision Tree Model). As such, the embodiments may allow a retailer to determine which sales channel may be the most profitable to sell the item through during that future temporal period.

Turning to the drawings, FIG. 1 illustrates a block diagram of a forecasting system 100 that includes forecasting computing device 102 (e.g., a server, such as an application server), web server 104, workstation(s) 106, database 116, third-party data device 120, and multiple customer computing devices 110, 112, 114 operatively coupled over network 118. Forecasting computing device 102, workstation(s) 106, web server 104, third-party data device 120, and multiple customer computing devices 110, 112, 114 can each be any suitable computing device that includes any hardware or hardware and software combination for processing data. For example, each of forecasting computing device 102, web server 104, workstations 106, third-party data device 120, and multiple customer computing devices 110, 112, 114 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, each of forecasting computing device 102 and third-party data device 120 can be a computer, a workstation, a laptop, a server such as a cloud-based server, a distributed computing system, or one or more of any other suitable device. Each of multiple customer computing devices 110, 112, 114 can be a mobile device such as a cellular phone, a laptop, a computer, a table, a personal assistant device, a voice assistant device, a digital assistant, or any other suitable device.

Although FIG. 1 illustrates three customer computing devices 110, 112, 114, forecasting system 100 can include any number of customer computing devices 110, 112, 114. Similarly, forecasting system 100 can include any number of workstation(s) 106, forecasting computing devices 102, web servers 104, third-party data devices 120, and databases 116.

Workstation(s) 106 are operably coupled to communication network 118 via router (or switch) 108. Workstation(s) 106 and/or router 108 may be located at a store 109, for example. In some examples, workstation 106 is a register at store 109. Workstation(s) 106 can communicate with forecasting computing device 102 over communication network 118. The workstation(s) 106 may send data to, and receive data from, forecasting computing device 102. For example, the workstation(s) 106 may transmit data related to a transaction, such as a purchase transaction, to forecasting computing device 102. Workstation(s) 106 may also communicate with web server 104. For example, web server 104 may host one or more web pages, such as a retailer's website. Workstation(s) 106 may be operable to access and program (e.g., configure) the webpages hosted by web server 104 through, for example, an Application Programming Interface (API).

Database 116 can be a remote storage device, such as a cloud-based server, a memory device on another application server, a networked computer, or any other suitable remote storage. Forecasting computing device 102 is operable to communicate with database 116 over communication network 118. For example, forecasting computing device 102 can store data to, and read data from, database 116. Although shown remote to forecasting computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

In some examples, third-party data device 120 provides market data, such as transactional or purchase data, which may be aggregated based on sales of items from one or more retailers. For example, a third-party data supplier 121 may aggregate purchase information for a plurality of items, such as purchases of items from various retailers. The third-party data supplier 121 may allow access to the information via, for example, an API provided by third-party data device 120. In some examples, forecasting computing device 102 requests the aggregated purchase information from third-party data device 120 via, for example, the API, and in response receives the aggregated purchase information. The aggregated purchase information may identify, for each of the plurality of items, one or more of an item identifier, a sale price, a sale date, and, in some examples, a retailer that sold the item.

Generating Item Sales Forecasts

Forecasting computing device 102 may apply a trained machine learning process, such as a trained machine learning or artificial intelligence model, to features generated for an item to generate output data characterizing one or more of a sales change due to a change from a first sales channel to a second sales channel, and projected sales for second sales channel. In some examples, the trained machine learning process includes a Random Forrest Regression model.

For example, forecasting computing device 102 may obtain, from database 116, customer data characterizing purchase transactions, such as in-store or online purchase transactions, for one or more customers. Forecasting computing device 102 may parse the customer data to extract purchase data characterizing purchases of an item over a temporal period (e.g., the last 30 days, the last quarter, etc.). The purchase data may include historical sales of the item including item prices, delivery speeds, and corresponding dates. Additionally, the purchases of the item may correspond to a first sales channel through which the item was sold. For example, the items may have been sold over a first sales channel where the retailer maintains inventory of the item and controls the selling price of the item.

Further, forecasting computing device 102 may generate features based on the purchase data. For example, the forecasting computing device 102 may generate one or more feature vectors based on the purchase data. The generated features may include, for example, one or more of price features, delivery speed features, and season features (e.g., winter, spring, summer, fall, holiday season, etc.). The season features may be determined from the dates the items were sold, for example. The forecasting computing device 102 may also generate features characterizing the first sales channel and a second sales channel. The second sales channel may correspond to, for example, a sales channel where a third-party, such as a supplier, controls the inventory and the pricing of the item.

Forecasting computing device 102 may then apply a trained machine learning process, such as a trained Random Forrest Regression model, to the generated features to generate output data. As described herein, the trained machine learning process may map the plurality of features to predicted sales changes from the first sales channel to the second sales channel. The generated output data may characterize a predicted sales change (e.g., increase, or decrease) if the item were sold through the second sales channel rather than the first sales channel.

In some examples, forecasting computing device 102 adjusts the predicted sales change based on an item's category and a season that corresponds to the future temporal period. For example, forecasting computing device 102 may maintain within database 116, seasonal weight values, where a seasonal weight value is associated with a particular season and a particular item category. Forecasting computing device 102 may determine an item category of a particular item, and adjust the predicted sales change for the item based on the corresponding seasonal weight value for the item and the season corresponding to the future temporal interval (e.g., holiday season). For example, the predicted sales change for an item may be increased when the future temporal period falls within a holiday season, and may decrease when the future temporal period falls within the summer season.

The retailer may determine whether to place the item for sale through the first sales channel, or the second sales channel, during a future temporal period based on the predicted sales change. In some examples, forecasting computing device 102 stores the generated output data in database 116. In some examples, forecasting computing device 102 transmits a message to another computing device based on the generated output data.

In some examples, the trained machine learning process includes multiple trained machine learning models. For example, each of the trained machine learning models may correspond to a category of items (e.g., a type of item, a department an item is sold in, any suitable categorical identification of the item), to a first (e.g., current) sales channel, and to a second (e.g., future) sales channel. Forecasting computing device 102 may determine a category of an item based on, for example, an item identifier (e.g., UPC code, item ID, etc.) associated with the item (e.g., received with the extracted purchase data). Based on the category of an item, the first sales channel, and the second sales channel, forecasting computing device 102 may determine the trained machine learning model to apply to the features generated for an item.

In some examples, forecasting computing device 102 determines the sales effect of selling one or more items on a first sales channel compared to plurality of other sales channels. For instance, forecasting computing device 102 may determine sales changes if an item where sold on a given sales channel instead of one or more other sales channels. In some examples, forecasting computing device 102 may determine the total sales changes for selling an item on the given sales channel according to the following equation:

$$F_{ensemble} = \sum_{i=1}^{n} e_i * s_i \qquad (eq. 1)$$

where:
   $e_i$ is a sales change due to channel change from an $i^{th}$ channel to given channel; and
   $s_i$ is the projected sales of the $i^{th}$ channel change.

In some examples, forecasting computing device 102 applies a ranking model, such as one based on a machine learning model or artificial intelligence model, to output data generated for a plurality of items to rank the items. For example, forecasting computing device 102 may apply any of the trained machine learning processes described herein to generate output data for each of a plurality of items corresponding to a temporal interval (e.g., the next month) and to a particular sales channel (e.g., the second sales channel). Further, forecasting computing device 102 may generate feature vectors based on the output data for each of the plurality of items, and apply the trained ranking model to the generated feature vectors to generate additional output data characterizing a ranking of the plurality of items. For example, the ranking model may operate on the generated feature vectors to determine an item with a predicted highest sales during the temporal interval, and may rank the item with the predicted highest sales as first in the ranking. The ranking model may further rank other items in accordance with their projected sales during the temporal interval. A retailer may determine which items to sell through the second sales channel based on the ranking.

Feature Generation

Forecasting computing device 102 may train the machine learning processes described herein. For example, forecasting computing device 102 may obtain, from database 116, customer data for a plurality of customers covering purchases of a plurality of items over a temporal period (e.g., the last 12 months, the last year, etc.). In some examples, forecasting computing device 102 receives market data characterizing purchases from other retailers from third-party device 120.

Further, forecasting computing device 102 may parse the customer data and/or market data to determine a sales channel corresponding to the purchases. For example, forecasting computing device 102 may determine at least a subset of the plurality of items that have sold through multiple sales channels, such as through a first sales channel and a second sales channel, over the temporal period. Moreover, and for those items that have sold through the multiple sales channels, forecasting computing device 102 may aggregate the customer data corresponding to purchases performed through the first sales channel, and may also aggregate the customer data corresponding to purchases performed through the second sales channel. In some examples, forecasting computing device 102 aggregates the customer data for an item only when purchases for the item through each of the first sales channel and the second sales channel are at least a first minimum amount, and a second minimum amount, respectively. In some examples, the first minimum amount and the second minimum amount are not equal, and in other examples they are equal.

Based on the aggregated data for each of the first and second sales channels, forecasting computing device 102 generates features. For example, and for each of the first and second sales channels, forecasting computing device 102 may generate features characterizing total sales of each item, a delivery speed of each purchase, an item price of each purchase, and in some examples, delivery speed ratios and/or price ratios based on delivery speeds and prices for a same item performed through the first and second channels. In some examples, forecasting computing device 102 generates features based on seasonality. For example, forecasting computing device 102 may determine a season each purchase was made in based on the date corresponding to the purchase, and may generate a feature based on the determined season.

Further, in some examples, forecasting computing device 102 may identify and adjust for fixed sales effects sales data for each item in an effort to isolate a channel effect of selling each item through the second sales channel compared to the first sales channel. For example, and assuming an item was sold through a first sales channel during a first temporal period and through a second sales channel during a second temporal period, a ratio of sales of the item during the second temporal period (and corresponding to the second sales channel) to sales of the item during the first temporal period (and corresponding to the first sales channel) may be given by the following equation:

$$y_{ijk} = \mu * c_j * d_i * t_{ijk}^l \quad \text{(eq. 2)}$$

where:

$$y_{ijk} = \frac{\text{sales}_{ch2}}{\text{sales}_{ch1}}; \quad \text{(eq. 3)}$$

μ is a general effect;
$c_j$ is an $j^{th}$ category effect;
$d_i$ is an $i^{th}$ department effect;
$t_{ijk}$ is the treatment effect; and
l=1 for items not changing channels, and 0 for items changing channels (or meeting a minimum sales threshold).

The category effect may characterize a sales effect of an item's category (e.g., home goods, clothing, groceries, lawn, sporting equipment, etc.) on its price in varying channels. A department effect characterizes a sales effect of an item's department (e.g., home department, women's clothing department, men's clothing department, deli department, fruits and vegetables department, etc.) on its price in varying channels. Further, a general effect characterizes a sales effect of generally selling items in the varying channels (e.g., 20% more sales of items are historically made through a second sales channel than a first sales channel).

To estimate the category ($c_j$), department ($d_i$), and general (e.g., general mean, μ) effects, forecasting computing device 102 may minimize an object function. In some examples, the object function may be given by the following equation:

$$\Sigma_{i,j,k} \beta(\mu, c_j, d_i) \quad \text{(eq. 4)}$$

where β represents an encompassing function for parameter estimation.

In some examples, the object function may be minimized according to the following equation:

$$\Sigma_{i,j,k} \beta(\mu, c_j, d_i) = \Sigma_{i,j,k} (\log y_{ijk} - \log \mu - \log c_j - \log d_i - l \log t_{ijk})^2 \quad \text{(eq. 5)}$$

Forecasting computing device 102 may apply any minimization algorithm, for example, to determine the minimum of the objective function and estimate the fixed effects. Once each of the fixed effects are determined (e.g., based on minimizing the objective function), forecasting computing device 102 may compute a sales change (e.g., treatment effect) caused by selling an item in the second sales channel compared to the first sales channel. For example, forecasting computing device 102 may determine the sales change based on the determined fixed sales effects, the aggregated sales of the item in the second sales channel (e.g., total of all sales of the item in the second sales channel), and the aggregated sales of the item in the first sales channel (e.g., total of all sales of the item in the first sales channel). For example, forecasting computing device 102 may determine the sales change according to the following equation:

$$\log t_{ijk} = \log \text{sales}_{ch2} - \log \text{sales}_{ch1} - \log \hat{\mu} - \log \hat{c}_j - \log \hat{d}_i \quad (eq.\ 6)$$

As an example, assume that an item sold multiple times for a total of $100 when sold through the first sales channel, and sold multiple times for a total of $150 when sold through the second sales channel. The fixed sales effects, including the category effect, department effect, and general effect (e.g., general mean effect), may be responsible for $30 of the difference, while the treatment effect $t_{ijk}$ for the item may be $20. In other words, selling the item through the second sales channel results in $20 (e.g., over the given temporal period) than if sold through the first sales channel.

Forecasting computing device 102 may adjust the total sales and/or prices of the items for the second sale channel based on the determined sales changes for each item, and may generate the sales and/or price features based on the corresponding adjusted sales and/or prices, respectively.

Forecasting computing device 102 may train the machine learning processes described herein based on the generated features (e.g., using supervised learning). For example, forecasting computing device 102 may train a first Random Forrest Regression model with first features generated for items within a particular category, and corresponding to a first sales channel and a second sales channel. Forecasting computing device 102 may train a second Random Forrest Regression model with second features generated for items within another particular category, and corresponding to the first sales channel and the second sales channel.

Forecasting computing device 102 may determine that the machine learning process is sufficiently trained (e.g., the machine learning process has converged) when at least one metric meets a predetermined threshold. For example, forecasting computing device 102 may determine that the machine learning process sufficiently maps the plurality of features to predicted sales changes from a first sales channel to a second sales channel when at least one metric value is beyond a threshold. The computed metrics may include, for example, computed precision values, computed recall values, and computed area under curve (AUC) for receiver operating characteristic (ROC) curves or precision-recall (PR) curves.

Further, in some examples, forecasting computing device 102 validates the one or more trained machine learning processes with one or more validation sets, and may further compute the one or more metrics based on the output data generated from applying the machine learning processes to the validation sets. If one or more of the computed metrics satisfy a corresponding threshold, forecasting computing device 102 determines that the machine learning process has converged.

Once a machine learning model is sufficiently trained and/or validated, forecasting computing device 102 stores corresponding machine learning model parameters (e.g., hyperparameters, configuration settings, weights, etc.) in database 116. As such, during inference, forecasting computing device 102 may obtain the parameters from database 116, configure the machine learning model with or based on the obtained parameters, and execute the machine learning model accordingly.

Figure 2:
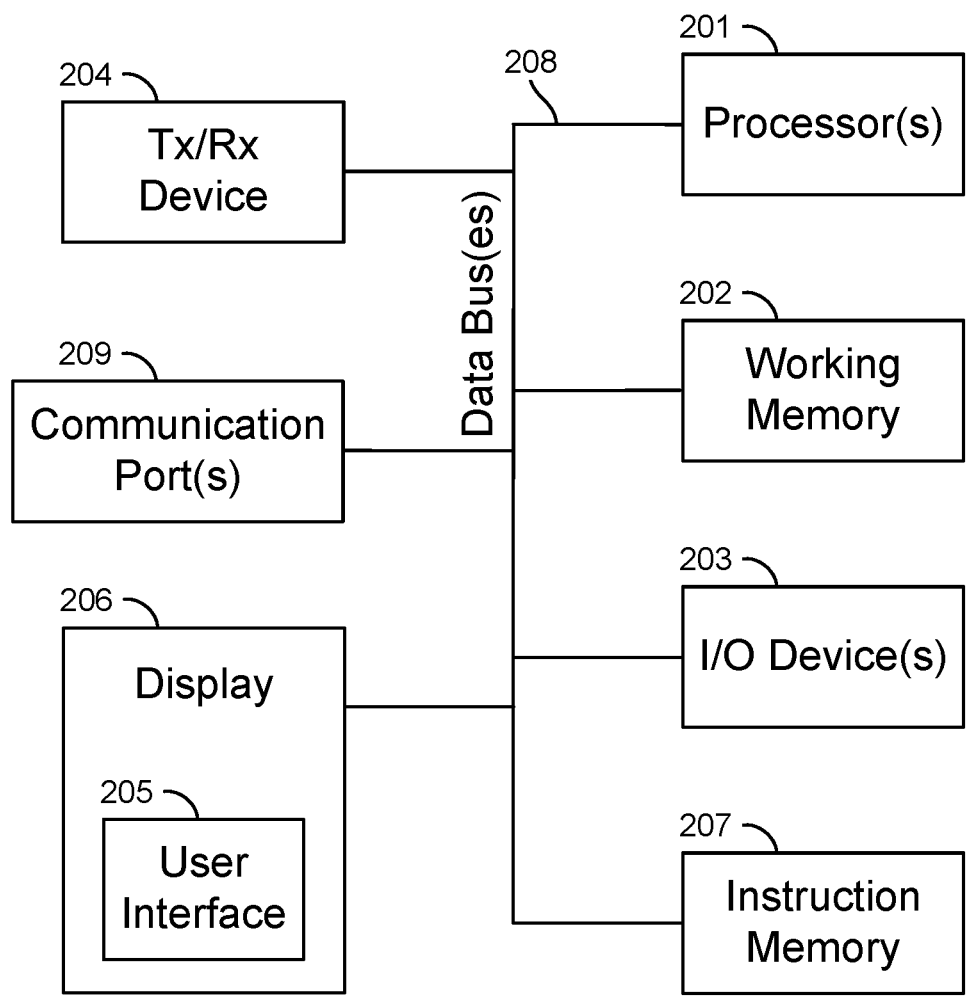
FIG. 2 is a block diagram of an exemplary computing device in accordance with some embodiments.

FIG. 2 illustrates an exemplary forecasting computing device 102 of FIG. 1. Forecasting computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including training and executing any of the machine learning processes described herein. Instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of forecasting computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as transaction data.

Display 206 can display user interface 205. User interfaces 205 can enable user interaction with forecasting computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 forecasting computing device 102 will be operating in. Processor(s) 201 is operable to receive data from, or send data to, a network, such as communication network 118 of FIG. 1. via transceiver 204.

Figure 3:
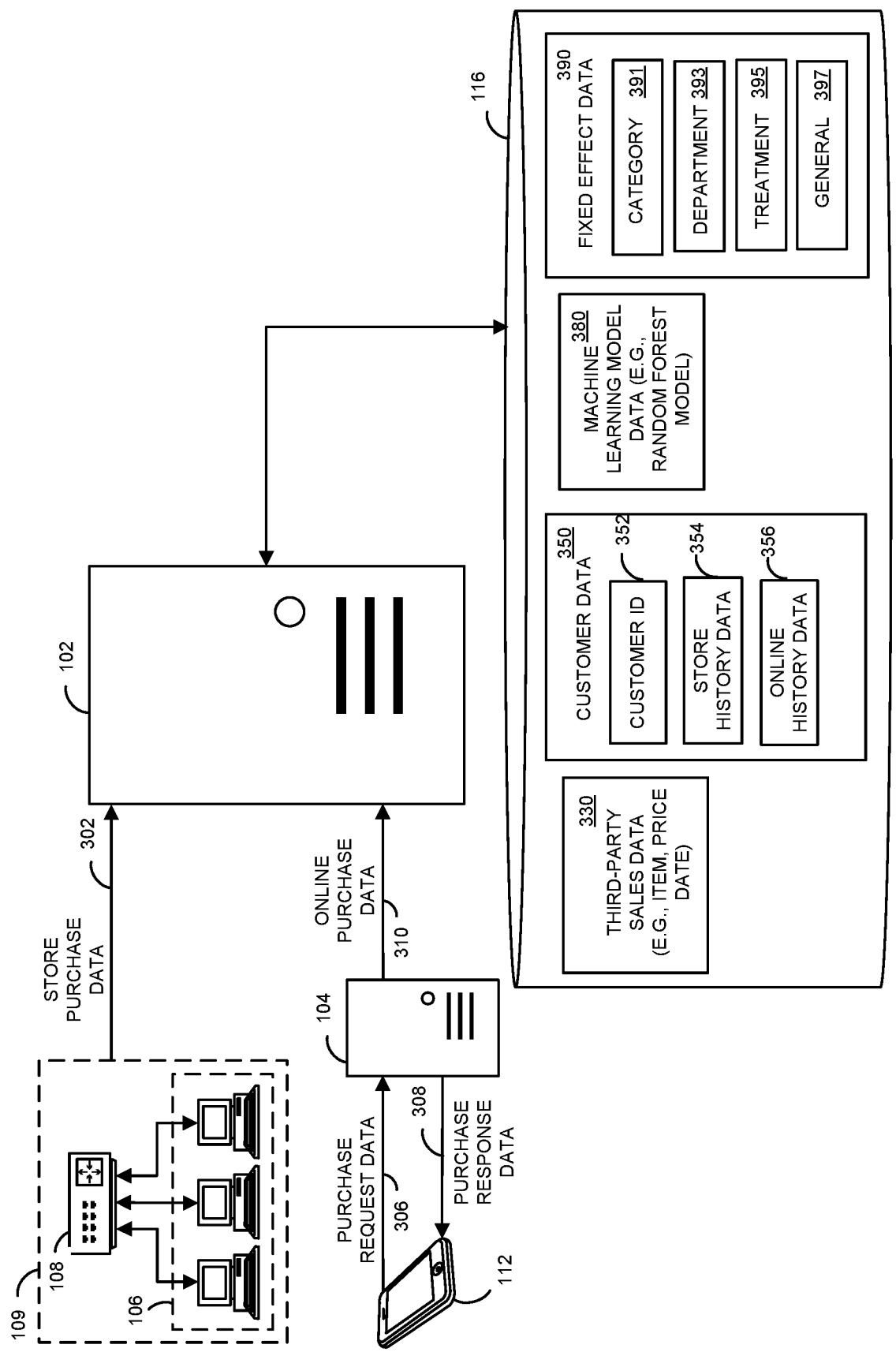
FIG. 3 is a block diagrams illustrating examples of various portions of the forecasting system of FIG. 1 in accordance with some embodiments.

FIG. 3 is a block diagram illustrating examples of various portions of the forecasting system of FIG. 1. In this example, forecasting computing device 102 can receive from a store 109 (e.g., from a computing device, such as workstation 106, at store 109) store purchase data 302 identifying the purchase of one or more items. Store purchase data 302 may include, for example, one or more of the following: an identification of one or more items being purchased; a price of each item being purchased; an identification of the customer (e.g., customer ID, passport ID, driver's license number, etc.); a method of payment (i.e., payment form) used to purchase the items (e.g., credit card, cash, check); a Universal Product Code (UPC) number for each item; a time and/or date; and/or any other data related to the purchase transaction.

Forecasting computing device 102 may parse store purchase data 302 and extract data associated with the purchase, and store the extracted data within database 116. For example, forecasting computing device 102 may store the extracted information, which may include one or more of the item IDs, item prices, customer ID, payment form, and item UPC numbers, as customer data 350 within database 116. For instance, customer data 350 may include, for each of a plurality of customers, a customer ID 352 which characterizes one or more customer IDs, and corresponding store history data 354, which may include one or more of the item IDs, item prices, customer ID, payment form, and item UPC numbers for each purchase at store 109.

Similarly, forecasting computing device 102 can receive from a web server 104, such as a web server hosting a retailer's website, online purchase data 310 identifying the purchase of one or more items from the website. For example, web server 104 may receive purchase request data 306 from customer computing device 112, where purchase request data 306 identifies a request to purchase one or more items from a website, such as a retailer's website. Web server 104 may generate online purchase data 310 based on purchase request data 306. For example, online purchase data 310 may include one or more of the following: an identification of one or more items being purchased; a price of each item being purchased; an identification of the customer (e.g., customer ID, passport ID, driver's license number, etc.); a method of payment (i.e., payment form) used to purchase the items (e.g., credit card, cash, check); a Universal Product Code (UPC) number for each item; a time and/or date; and/or any other data related to the purchase transaction. Web server 104 may process purchase request data 104 to establish the purchase of the items, and may generate purchase response data 308 confirming the purchase of the items, and may transmit purchase response data 308 to customer computing device 112. Moreover, web server 104 may generate online purchase data 310 characterizing the purchase, and may transmit online purchase data 310 to forecasting computing device 102. For example, online purchase data 310 may include one or more of: a customer ID, one or more item IDs, one or more item prices, payment form, and one or more item UPC numbers.

Forecasting computing device 102 may parse online purchase data 310 and extract data associated with the purchase, and store the extracted data within database 116. For example, forecasting computing device 102 may store the extracted information, which may include one or more of the item IDs, item prices, customer ID, payment form, and item UPC numbers, as customer data 350 within database 116. For instance, customer data 350 may include, for each of a plurality of customers, a customer ID 352 which characterizes one or more customer IDs, and corresponding online history data 356, which may include one or more of the item IDs, item prices, customer ID, payment form, item UPC numbers, and delivery speeds (e.g., how long from purchase to a promised, or actual, delivery time) for each purchase on the website hosted by web server 104.

Forecasting computing device 102 may also aggregate third-party sales data 330 within database 116. Third-party sales data 300 may characterize sales of the item by retailers or suppliers, and may be received, for example, from one or more third-party data devices 120. Third-party sales data 330 may include, for one or more purchased items, an item ID, a price, a retailer or supplier, a date of an item purchase, and/or any other information relevant to the purchased items. In some examples, third-party sales data 330 is aggregated by item, and may include, for each item, a total number of items sold, a total sales of the item (e.g., a total amount of all sales for the item), average delivery speed, and a date range of the sold items.

In some embodiments, forecasting computing device 102 may train a machine learning process with features generated from customer data 350 and/or third-party sales data 330 as described herein. For example, forecasting computing device 102 may parse the customer data 350 and/or third-party sales data 330 to determine one or more items that were sold through first sales channel over a first temporal period, and also sold through a second sales channel over a second temporal period. The second temporal period may be subsequent to the first temporal period. Further, the transition from the first temporal period to the second temporal period may indicate a point in time (e.g., a date) when an item shifted from being sold through the first sales channel to the second sales channel.

Figure 4:
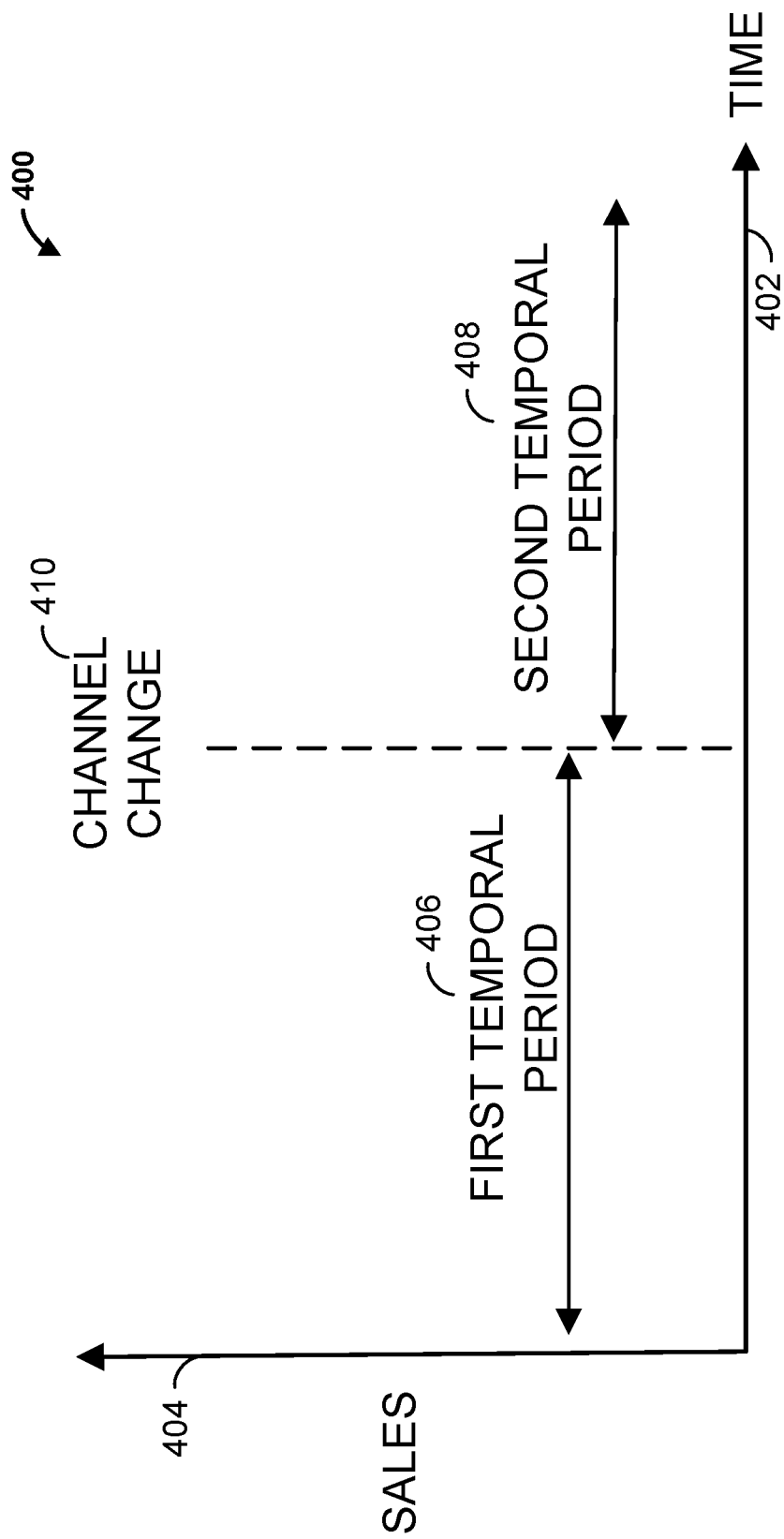
FIG. 4 is a sales graph 1 in accordance with some embodiments.

For instance, FIG. 4 illustrates a graph 400 that includes a time axis 402 and a sales axis 404. The graph 400 further indicates a first temporal period 406 that transitions to a second temporal period 408 at a point in time marked by a channel change 410. For example, and based on customer data 350 and/or third-party sales data 330, forecasting computing device 102 may extract sales of an item, such as a lawn mower, that were sold during the first temporal period 406 through a first sales channel, and sales of the same item that were sold during the second temporal period 408 (e.g., beginning at the channel change 410) through a second sales channel. In some instances, although the item may have also been sold through the first sales channel during the second temporal period, forecasting computing device 102 extracts, for the second temporal period, only the sales made through the second sales channel.

Referring back to FIG. 3, and for each of the items determined to be sold through the first sales channel over the first temporal period, forecasting computing device 102 may generate features characterizing total sales of each item, a delivery speed of each purchase, an item price of each purchase, and in some examples, delivery speed ratios and/or price ratios based on delivery speeds and prices for a same item performed through the first and second channels. In some examples, forecasting computing device 102 generates features based on seasonality. For example, forecasting computing device 102 may determine a season each purchase was made in based on the date corresponding to the purchase, and may generate a feature based on the determined season.

Similarly, for each of the items determined to be sold through the second sales channel over the second temporal period, forecasting computing device 102 may generate features characterizing total sales of each item, a delivery speed of each purchase, an item price of each purchase, and in some examples, delivery speed ratios and/or price ratios based on delivery speeds and prices for a same item performed through the first and second channels. In some examples, forecasting computing device 102 generates features based on seasonality. For example, forecasting computing device 102 may determine a season each purchase was made in based on the date corresponding to the purchase, and may generate a feature based on the determined season.

In some examples as described herein, forecasting computing device 102 may adjust the sales data (e.g., total sales for an item, item prices) for the items sold through the second sales channel over the second temporal period for fixed sales effects to determine a channel effect of selling each item through the second sales channel compared to the first sales channel. For example, forecasting computing device 102 may determine the channel effect based on total sales during the second temporal period, total sales during the first temporal period, a category effect, a department effect, and a general effect (e.g., general mean effect). The category effect, department effect, and general effect may be determined by minimizing an objective function as described herein, and may be stored as fixed effect data 390 within database 116. For example, fixed effect data 390 may include category effect values 391, department effect values 393, treatment effect values 395, and general effect values 397, for one or more machine learning models. Forecasting computing device 102 may then generate features based on the corresponding adjusted sales and/or prices.

Further, and based on the generated features, forecasting computing device 102 may train the machine learning processes. For example, forecasting computing device 102 may categorize the generated features based on the first sales channel, second sales channel, and by item category. As an example, forecasting computing device 102 may generate a "first bucket" of features corresponding to purchases of items of a first item category that were sold through the first sales channel during the first temporal period and were also sold through the second sales channel during the second temporal period. Forecasting computing device 102 may train a first Random Forrest Regression model based on the first bucket of features.

Further, forecasting computing device 102 may generate a "second bucket" of features corresponding to purchases of items of the first item category that were sold through the first sales channel during the first temporal period and were also sold through a third sales channel during the second temporal period. Forecasting computing device 102 may train a first Random Forrest Regression model based on the second bucket of features.

Similarly, forecasting computing device 102 may generate a "third bucket" of features corresponding to purchases of items of a second item category that were sold through the first sales channel during the first temporal period and were also sold through the second sales channel during the second temporal period. Forecasting computing device 102 may train a third Random Forrest Regression model based on the third bucket of features.

Further, forecasting computing device 102 may generate a "fourth bucket" of features corresponding to purchases of items of the second item category that were sold through the first sales channel during the first temporal period and were also sold through the third sales channel during the second temporal period. Forecasting computing device 102 may train a fourth Random Forrest Regression model based on the fourth bucket of features.

Forecasting computing device 102 may continue training (e.g., using supervised learning) each of the Random Forrest Regression models until they converge, as described herein. For example, forecasting computing device 102 may determine that any of the Random Forrest Regression models have converged when at least one computed metric satisfies a predetermined threshold. In some examples, as described herein, the Random Forrest Regression model is further validated.

Once a Random Forrest Regression model converges, forecasting computing device 102 may store corresponding machine learning model parameters (e.g., hyperparameters, configuration settings, weights, etc.) as machine learning model data 380 within database 116. For example, machine learning model data 380 may characterize one or more trained Random Forrest Regression model (e.g., one model for each item category, first sales channel, second sales channel combination).

Figure 5A:
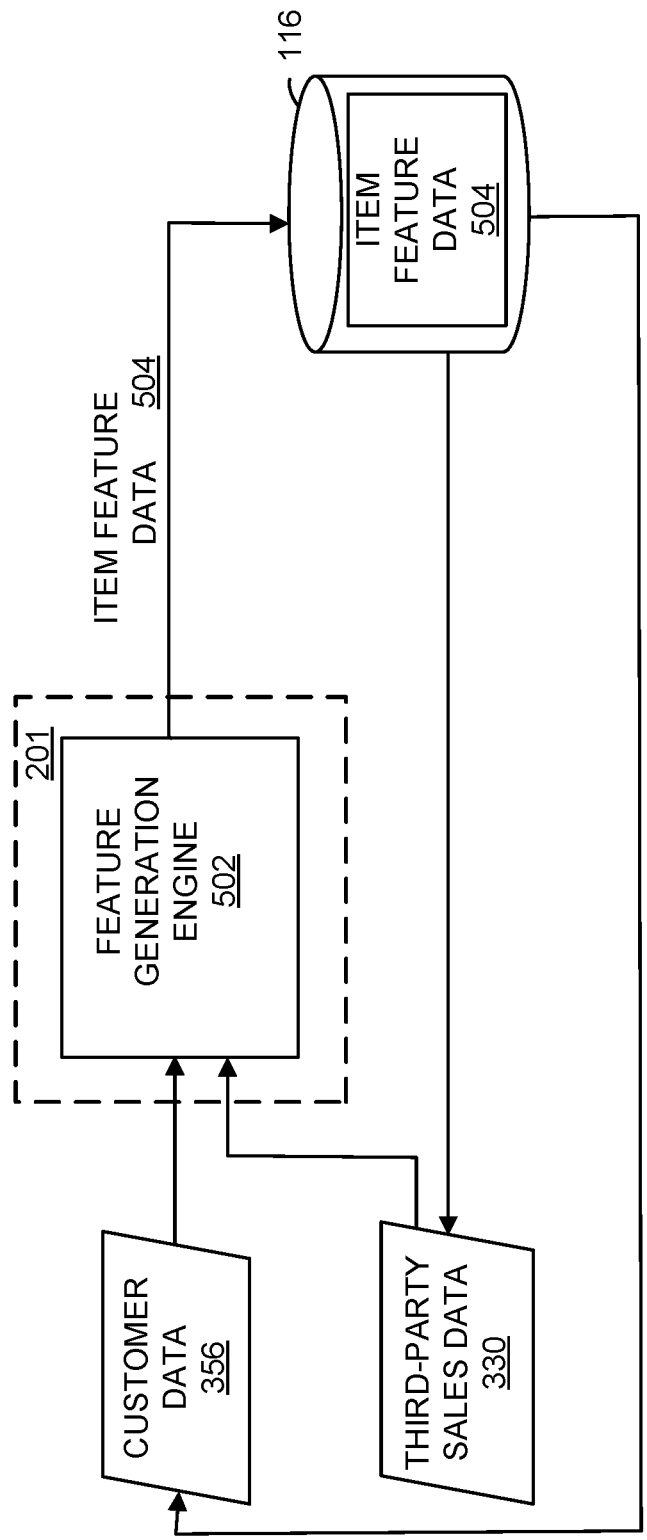
FIGS. 5A and 5B illustrates examples of various portions of the forecasting system of FIG. 1 in accordance with some embodiments.
Figure 5B:
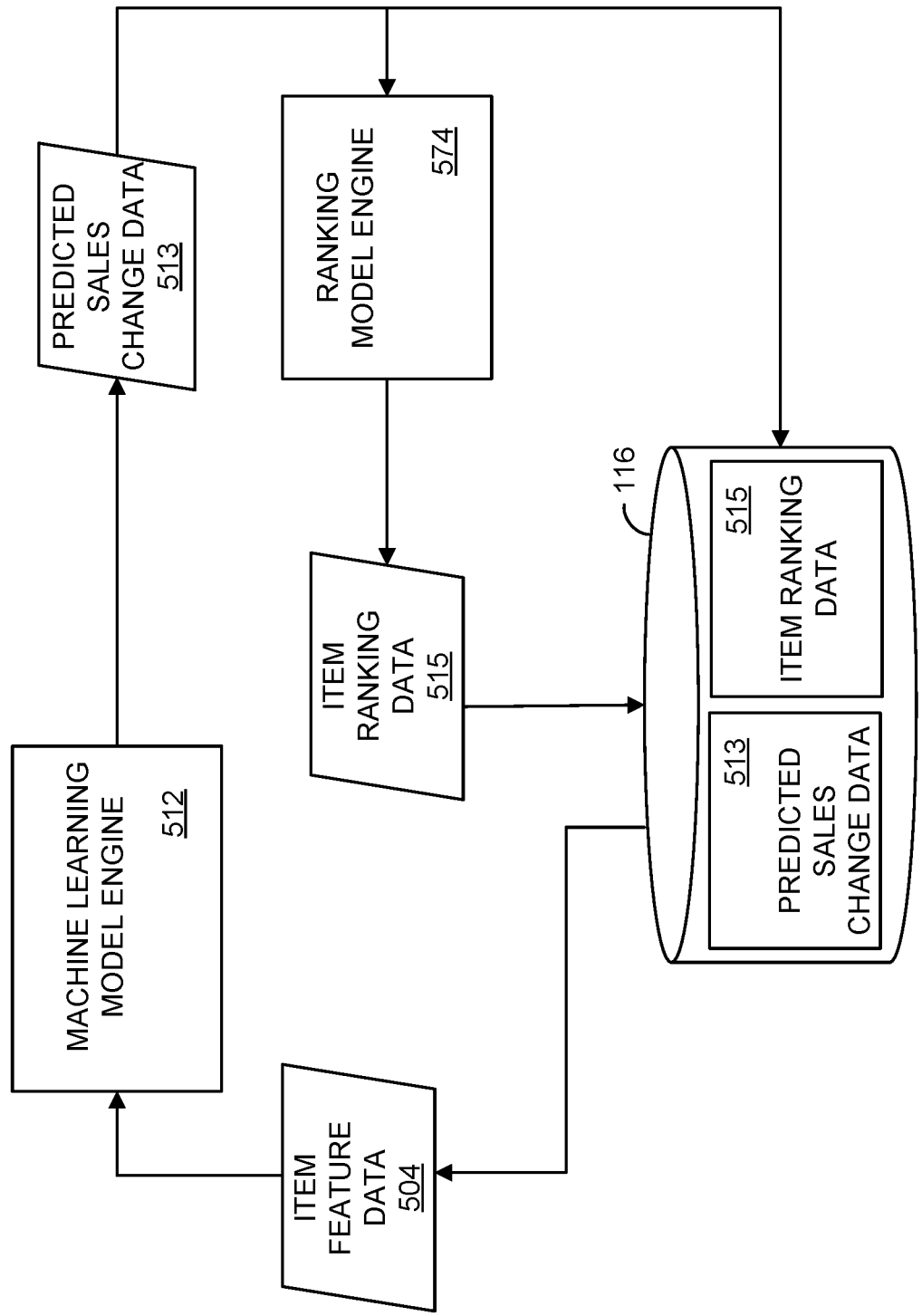

FIGS. 5A and 5B illustrate exemplary portions of forecasting computing device 102 that generate features and apply the machine learning processes described herein during inference. As illustrated in FIG. 5A, a feature generation engine 502 obtains customer data 356 and, in some examples, third-party sales data 350, and generates features as described herein. For example, feature generation engine 02 may generate features for items sold through a first sales channel during a first temporal period. Feature generation engine 502 may also generate features characterizing a second sales channel, such as one that differs from the first sales channel. Feature generation engine 502 may package the generated features within item feature data 504, and may store item feature data 504 within data repository 116. For example, feature generation engine 502 may store item feature data 04 within database 116 based on (e.g., categorized by) an item category and the first sales channel.

Referring to FIG. 5B, a machine learning engine 512 obtains item feature data 504 from database 116, and applies a trained machine learning process, such as a trained Random Forrest Regression model, to item feature data 504 to generate predicted sales change data 513 characterizing a predicted sales for the item if sold through the second sales channel during a second temporal period (e.g., a future temporal period, such as next month, or next holiday season). In some examples, machine learning engine 512 stores the predicted sales change data 513 within database 116.

In some examples, a ranking model engine 574 receives predicted sales change data 513 from machine learning model engine 512 (or, in some instances, from database 116), and ranks items based on the predicted sales change data 513. The ranking model engine 574 may apply a trained machine learning model or artificial intelligence model item ranking to predicted sales change data 513 for a plurality of items to rank the plurality of items. Ranking model engine 574 may generate item ranking data 515 characterizing the ranking of items (e.g., per item category to be sold through the second sales channel during the second temporal period), and may store item ranking data 515 within database 116.

In some examples, one or more of feature generation engine 502, machine learning engine 512, and ranking model engine 574 may be implemented in hardware. In some examples, one or more of feature generation engine 502, machine learning engine 512, and ranking model engine 574 may be implemented as an executable program maintained in a tangible, non-transitory memory, such as instruction memory 207 of FIG. 2, which may be executed by one or processors, such as processor 201 of FIG. 2.

Figure 6A:
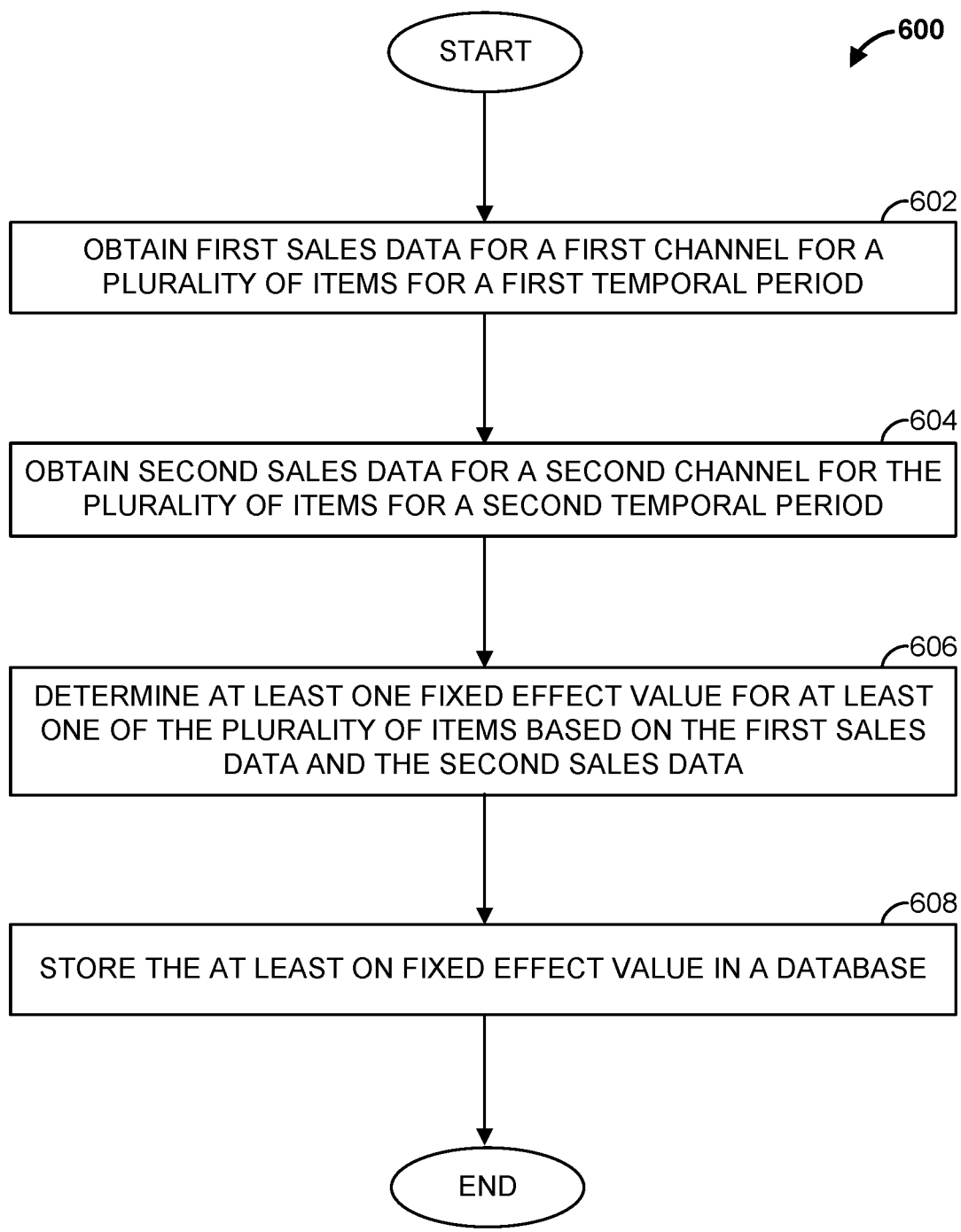
FIGS. 6A and 6B are flowcharts of example methods that can be carried out by the forecasting system 100 of FIG. 1 in accordance with some embodiments.

FIG. 6A is a flowchart of an example method 600 that can be carried out by the forecasting computing device 102 of FIG. 1. Beginning at step 602, forecasting computing device 102 obtains (e.g., from database 116) first sales data, where the first sales data is for a plurality of items sold through a first sales channel during a first temporal period. At step 604, forecasting computing device 102 obtains second sales data, where the second sales data is for the plurality of items but sold through a second sales channel during a second temporal period. Proceeding to step 606, forecasting computing device 102 determines at least one fixed effect value for at least one of the plurality of items based on the first sales data and the second sales data. For example, and as described herein, forecasting computing device 102 may estimate one or more fixed effects based on minimizing an objective function of the fixed effects, such as minimizing an objective function of a category effect, department effect, and general effect (e.g., see eq. 4, eq. 5, above). Further, and at step 608, the forecasting computing device 102 stores the at least one fixed effect value in a database.

Figure 6B:
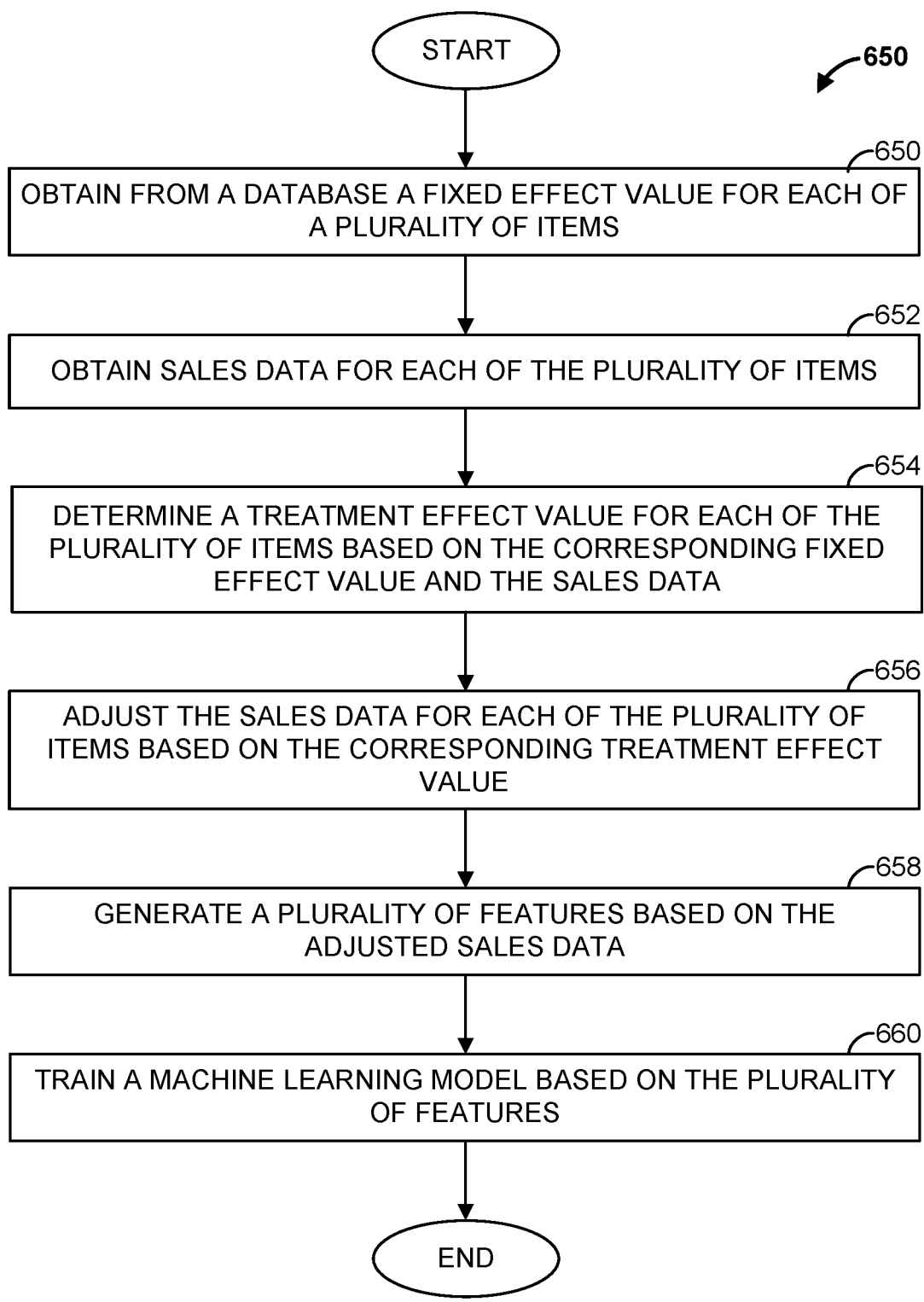

FIG. 6B is a flowchart of an example method 650 that can be carried out by the forecasting computing device 102 of FIG. 1. Beginning at step 652, forecasting computing device 102 obtains (e.g., from database 116) at least one fixed effect value for each of a plurality of items (e.g., or item categories). At step 652, forecasting computing device 102 obtains sales data for each of the plurality of items. The sales data may characterize aggregated sales of each item in a first sales channel, and aggregated sales of each item in a second sales channel.

Proceeding to step 654, forecasting computing device 102 determines a treatment effect value for each of the plurality of items based on the corresponding fixed effect value and the sales data (e.g., the aggregated sales of each item in the second sales channel, and the aggregated sales of each item in the first sales channel; see eq. 6, above). At step 656, forecasting computing device 102 adjusts the sales data for each of the plurality of items based on the corresponding treatment effect value. For example, forecasting computing device 102 may adjust the total sales and/or prices of the items based on their corresponding treatment effect value.

Further, and at step 656, forecasting computing device 102 generates a plurality of features based on the adjusted sales data. In some instances, the generated features characterize a season of when the purchases were made. At step 660, forecasting computing device 102 trains a machine learning model based on the plurality of features. For example, and as described herein, forecasting computing device 102 may train a Random Forrest Regression model based on the generated features. Once trained, forecasting computing device 102 may store machine learning model parameters (e.g., hyperparameters, configuration settings, weights, etc.) corresponding to the trained machine learning model in a database, such as in database 116.

Figure 7:
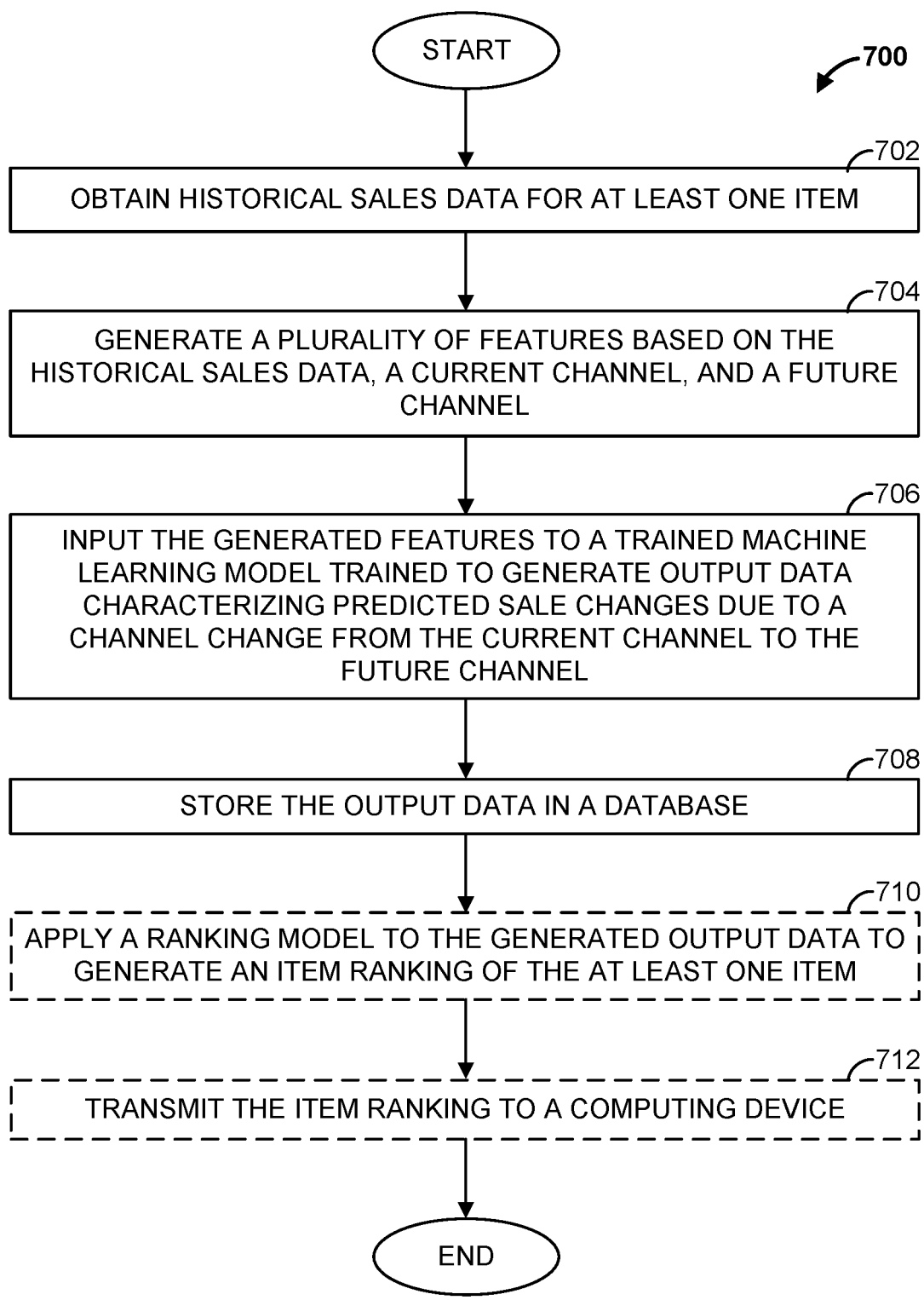
FIG. 7 is a flowchart of another example method that can be carried out by the forecasting system 100 of FIG. 1 in accordance with some embodiments.

FIG. 7 is a flowchart of an example method 700 that can be carried out by the forecasting computing device 102 of FIG. 1. Beginning at step 702, forecasting computing device 102 obtains historical sales data for at least one item. For example, forecasting computing device 102 may obtain one or more of customer data 350 and third-party sales data 330 from database 116. At step 704, forecasting computing device 102 generates a plurality of features based on the historical sales data, a current channel, and a future channel. The current channel may correspond to a sales channel through which the at least one item is currently being sold The future channel may correspond to a sales channel to which the at least one item may be sold in the future.

Proceeding to step 706, forecasting computing device 102 inputs the generated features to a trained machine learning model trained to generate output data characterizing predicted sale changes due to a channel change from the current channel to the future channel. For example, forecasting computing device 102 may apply one of the trained Random Forrest Regression models described herein to generate output data characterizing an increase, or a decrease, in sales of the at least one item if sold through the future channel as compared to the current channel during a future temporal period. At step 708, forecasting computing device 102 stores the output data generated from the trained machine learning model in a database, such as database 116.

In some examples, forecasting computing device 102 applies a ranking model to the generated output data to generate an item ranking of the at least one item. For example, the ranking model may operate on the output data to determine an item with a predicted highest sales during the future temporal period, and may rank the item with the predicted highest sales as first in the ranking. The ranking model may further rank other items in accordance with their projected sales during the future temporal period. The forecasting computing device 102 may then, at step 712, transmit the item ranking to a computing device, such as to a server operated by the retailer at their headquarters.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a computing device comprising at least one processor, where the computing device is configured to:
 obtain first sales data for a first channel for a plurality of items for a first temporal period;
 obtain second sales data for a second channel for the plurality of items for a second temporal period;
 determine at least one fixed effect value wherein the at least one fixed effect value includes at least a category effect and a department effect for at least one of the plurality of items based on the first sales data and the second sales data;

determine a treatment effect value for each of the plurality of items based on the corresponding at least one fixed effect value, where the treatment effect value characterizes a sales effect of selling each of the plurality of items in the second channel compared to the first channel;

adjust the second sales data for the plurality of items based on the corresponding treatment effect value; and generate a first plurality of features based on the adjusted second sales data for the plurality of items;

generate output data by applying a machine learning process to the plurality of features, wherein the machine learning process is trained by inputting the first plurality of features into a first Random Forrest Regression Model and a second plurality of features into a second Random Forrest Regression Model, wherein the machine learning process is iteratively adjusted until the first and second Random Forrest Regression Models have converged, and wherein the first and second Random Forrest Regression Models are converged when at least one metric value is beyond a predetermined threshold and validated when the at least one metric value satisfies a corresponding threshold associated with a validation set; and generate predicted sale changes based on the output data to be transmitted to a computing device.

2. The system of claim 1, wherein the computing device is configured to generate output data characterizing a mapping of the first plurality of features to the predicted sales changes from the first channel to the second channel.

3. The system of claim 1, wherein determining the treatment effect value for each of the plurality of items comprises determining a minimization of an objective function of the at least one fixed effect value.

4. The system of claim 1 wherein the computing device is configured to:

receive third sales data for a first item;

generate a third plurality of features based on the third sales data and a third temporal period; and apply a machine learning process trained by inputting the first plurality of features into the first Random Forrest Regression Model, the second plurality of features into a second Random Forrest Regression Model, and the third plurality of features into a third Random Forrest Regression Model to generate additional output data, wherein the additional output data characterizes a predicted sales change of the first item during the third temporal period.

5. The system of claim 4, wherein the computing device is configured to apply a ranking model to the additional output data to generate a ranking of items that comprise the first item.

6. A method comprising:

obtaining first sales data for a first channel for a plurality of items for a first temporal period;

obtaining second sales data for a second channel for the plurality of items for a second temporal period;

determining at least one fixed effect value, wherein the at least one fixed effect value includes at least a category effect and a department effect for at least one of the plurality of items based on the first sales data and the second sales data;

determining a treatment effect value for each of the plurality of items based on the corresponding at least one fixed effect value, where the treatment effect value characterizes a sales effect of selling each of the plurality of items in the second channel compared to the first channel;

adjusting the second sales data for the plurality of items based on the corresponding treatment effect value; and generating a first plurality of features based on the adjusted second sales data for the plurality of items;

generating output data by applying a machine learning process to the plurality of features, wherein the machine learning process is trained by inputting the first plurality of features into a first Random Forrest Regression Model and a second plurality of features into a second Random Forrest Regression Model, wherein the machine learning process is iteratively adjusted until the first and second Random Forrest Regression Models have converged, and wherein the first and second Random Forrest Regression Models are converged when at least one metric is beyond a predetermined threshold and validated when the at least one metric value satisfies a corresponding threshold associated with a validation set; and generating predicted sale changes based on the output data to be transmitted to a computing device.

7. The method of claim 6 comprising generating output data characterizing a mapping of the first plurality of features to the predicted sales changes from the first channel to the second channel.

8. The method of claim 6 comprising:

receiving third sales data for a first item;

generating a third plurality of features based on the third sales data and a third temporal period; and applying a machine learning process trained by inputting the first plurality of features into the first Random Forrest Regression Model, the second plurality of features into a second Random Forrest Regression Model, and the third plurality of features into a third Random Forrest Regression Model to generate additional output data, wherein the additional output data characterizes a predicted sales change of the first item during the third temporal period.

9. The method of claim 8 comprising applying a ranking model to the additional output data to generate a ranking of items that comprise the first item.

10. A non-transitory computer readable medium having instructions stored thereon, wherein the instructions, when executed by at least one processor, cause a device to perform operations comprising:

obtaining first sales data for a first channel for a plurality of items for a first temporal period;

obtaining second sales data for a second channel for the plurality of items for a second temporal period;

determining at least one fixed effect value, wherein the at least one fixed effect value includes at least a category effect and a department effect for at least one of the plurality of items based on the first sales data and the second sales data;

determining a treatment effect value for each of the plurality of items based on the corresponding at least one fixed effect value, where the treatment effect value characterizes a sales effect of selling each of the plurality of items in the second channel compared to the first channel;

adjusting the second sales data for the plurality of items based on the corresponding treatment effect value; and generating a plurality of features based on the adjusted second sales data for the plurality of items;

generate output data by applying a machine learning process to the plurality of features, wherein the machine learning process is trained by inputting the first plurality of features into a first Random Forrest Regression Model and a second plurality of features into a second Random Forrest Regression Model, wherein the machine learning process is iteratively adjusted until the first and second Random Forrest Regression Models have converged, and wherein the first and second Random Forrest Regression Models are converged when at least one metric is beyond a predetermined threshold and validated when the at least one metric value satisfies a corresponding threshold associated with a validation set; and generating predicted sale changes based on the output data to be transmitted to a computing device.

11. The non-transitory computer readable medium of claim 10 wherein the instructions, when executed by the at least one processor, causes the device to perform operations comprising generating output data characterizing a mapping of the first plurality of features to the predicted sales changes from the first channel to the second channel.

12. The non-transitory computer readable medium of claim 10 wherein the instructions, when executed by the at least one processor, cause the device to perform operations comprising:

receiving third sales data for a first item;

generating a third plurality of features based on the third sales data and a third temporal period; and applying a machine learning process by inputting the first plurality of features into the first Random Forrest Regression Model, the second plurality of features into a second Random Forrest Regression Model, and the third plurality of features into a third Random Forrest Regression Model to generate additional output data, wherein the additional output data characterizes a predicted sales change of the first item during the third temporal period.

13. The non-transitory computer readable medium of claim 12 wherein the instructions, when executed by the at least one processor, cause the device to perform operations comprising applying a ranking model to the additional output data to generate a ranking of items that comprise the first item.

* * * * *